United States Patent
Nishii et al.

(10) Patent No.: US 12,208,375 B2
(45) Date of Patent: Jan. 28, 2025

(54) FUNCTIONAL STRUCTURE

(71) Applicants: NATIONAL UNIVERSITY CORPORATION HOKKAIDO UNIVERSITY, Sapporo (JP); FURUKAWA ELECTRIC CO., LTD., Tokyo (JP)

(72) Inventors: Mai Nishii, Tokyo (JP); Yuichiro Banba, Tokyo (JP); Kaori Sekine, Tokyo (JP); Yukako Nakai, Tokyo (JP); Masayuki Fukushima, Tokyo (JP); Sadahiro Kato, Tokyo (JP); Takao Masuda, Sapporo (JP); Yuta Nakasaka, Sapporo (JP); Takuya Yoshikawa, Sapporo (JP)

(73) Assignees: NATIONAL UNIVERSITY CORPORATION HOKKAIDO UNIVERSITY, Sapporo (JP); FURUKAWA ELECTRIC CO., LTD., Tokyo (JP)

(*) Notice: Subject to any disclaimer, the term of this patent is extended or adjusted under 35 U.S.C. 154(b) by 245 days.

(21) Appl. No.: 17/299,672

(22) PCT Filed: Dec. 3, 2019

(86) PCT No.: PCT/JP2019/047292
§ 371 (c)(1),
(2) Date: Jun. 3, 2021

(87) PCT Pub. No.: WO2020/116469
PCT Pub. Date: Jun. 11, 2020

(65) Prior Publication Data
US 2022/0032276 A1    Feb. 3, 2022

(30) Foreign Application Priority Data

Dec. 3, 2018 (JP) .................. 2018-226918

(51) Int. Cl.
B01J 29/76 (2006.01)
B01J 35/40 (2024.01)
(Continued)

(52) U.S. Cl.
CPC ............... *B01J 29/76* (2013.01); *B01J 35/40* (2024.01); *B01J 35/56* (2024.01); *B01J 35/643* (2024.01)

(58) Field of Classification Search
USPC ........................... 502/60, 73, 74, 77, 78, 79
See application file for complete search history.

(56) References Cited

U.S. PATENT DOCUMENTS 4,499,209 A    2/1985 Hoek et al.
5,275,720 A *  1/1994 Ward .................. C07C 5/41
                                        208/46

(Continued)

FOREIGN PATENT DOCUMENTS

CN    103889577 A    6/2014
CN    106964391 A    7/2017

(Continued)

OTHER PUBLICATIONS

Machine Translation of JP 2017-128480 A, Jul. 2017.*

(Continued)

*Primary Examiner* — Colin W. Slifka
(74) *Attorney, Agent, or Firm* — Oblon, McClelland, Maier & Neustadt, L.L.P.

(57) ABSTRACT

A functional structure which can resist a decrease in the function of the functional material and thus have a long life, can be free from the need for complicated replacement operation, can contribute to resource-saving, and can exhibit high catalytic activity when used, for example, as a catalyst. The functional structure includes supports each having porous structure and including a zeolite-type compound, and (Continued)

at least one functional substance present in the supports, in which each of the supports has channels communicating with one another, the functional material is present at least in the channel of each of the supports, and the supports have an average external size of 20 μm or less.

16 Claims, 4 Drawing Sheets

(51) Int. Cl.
  *B01J 35/56* (2024.01)
  *B01J 35/64* (2024.01)

(56) References Cited

U.S. PATENT DOCUMENTS

| | | | |
|---|---|---|---|
| 11,161,101 B2 * | 11/2021 | Kato | B01J 23/464 |
| 11,547,987 B2 | 1/2023 | Masuda et al. | |
| 11,648,538 B2 | 5/2023 | Masuda et al. | |
| 11,648,542 B2 | 5/2023 | Masuda et al. | |
| 11,648,543 B2 | 5/2023 | Masuda et al. | |
| 11,655,157 B2 | 5/2023 | Masuda et al. | |
| 11,666,894 B2 | 6/2023 | Masuda et al. | |
| 2003/0109383 A1 | 6/2003 | Koike et al. | |
| 2016/0030934 A1 | 2/2016 | Zhan et al. | |
| 2016/0137516 A1 * | 5/2016 | Kegnæs | B01J 29/044 585/467 |
| 2017/0036197 A1 | 2/2017 | Kegnaes et al. | |
| 2017/0341063 A1 * | 11/2017 | Otto | B01J 37/14 |

FOREIGN PATENT DOCUMENTS

| | | | |
|---|---|---|---|
| EP | 0 455 307 A1 | 11/1991 | |
| EP | 3 016 741 A1 | 5/2016 | |
| JP | 59-102440 A | 6/1984 | |
| JP | 4-227847 A | 8/1992 | |
| JP | 2016-529190 A | 9/2016 | |
| JP | 2017-515785 A | 6/2017 | |
| JP | 2017-128480 A | 7/2017 | |
| WO | WO 2007/023558 A1 | 3/2007 | |
| WO | WO 2010/097108 A1 | 9/2010 | |
| WO | WO 2010/097224 * | 9/2010 | |
| WO | WO 2010/097224 A2 | 9/2010 | |
| WO | WO 2013/057319 * | 4/2013 | |
| WO | WO 2013/057319 A2 | 4/2013 | |
| WO | WO 2015/001123 A1 | 1/2015 | |
| WO | WO 2015/155216 A1 | 10/2015 | |

OTHER PUBLICATIONS

Liu et al., "Cobalt nanoparticles imbedded into zeolite crystals" A tailor-made catalyst for one-step syntheses of gasoline from syngas, International Journal of Hydrogen Energy, 41, (2016) pp. 21965-21978.*
Alabahar et al., Microporous and Mesoporous Materials, 302 (2020), pp. 1-8.*
Xing et al., "Completed encapsulation of cobalt particles in mesoporous H-ZSM-5 zeolite catalyst for direct synthesis of middle isoparaffin from syngas", 55 (2014), pp. 53-56.*
Machine Translation of CN 108479843, Sep. 2018.*
Extended European Search Report issued Aug. 9, 2022 in European Patent Application No. 19894244.3, citing documents 15, 16, and 24 therein, 8 pages.
Chengyi Dai, et al., "Hollow zeolite encapsulated Ni—Pt bimetals for sintering and coking resistant dry reforming of methane," Journal of Materials Chemistry A, vol. 3, XP055336366, Jun. 29, 2015, 9 pages.
International Search Report issued on Mar. 10, 2020 in PCT/JP2019/047292 filed on Dec. 3, 2019, citing references AD, AE, AP-AV, and AX therein, 3 pages.
Laprune et al., "Highly Dispersed Nickel Particles Encapsulated in Multi-hollow Silicalite-1 Single Crystal Nanoboxes: Effects of Siliceous Deposits and Phosphorous Species on the Catalytic Performances", ChemCatChem, 2017, vol. 9, Issue 12, pp. 2297-2307 (12 total pages).
Combined Chinese Office Action and Search Report issued Jan. 18, 2023 in Chinese Patent Application No. 201980077928.0 (with unedited computer-generated English translation), citing references 15-17 therein, 19 pages.
U.S. Appl. No. 17/299,672, filed Jun. 3, 2021, Mai Nishii et al.
U.S. Appl. No. 17/299,718, filed Jun. 3, 2021, Mai Nishii et al.
U.S. Appl. No. 17/299,641, filed Feb. 10, 2022, Yuichiro Banba et al.
U.S. Appl. No. 17/167,280, filed Feb. 4, 2021, Sadahiro Kato et al.
U.S. Appl. No. 17/930,056, filed Sep. 6, 2022, Takao Masuda et al.
U.S. Appl. No. 16/698,496, filed Nov. 27, 2019, Takao Masuda et al.
U.S. Appl. No. 16/698,527, filed Nov. 27, 2019, Takao Masuda et al.
U.S. Appl. No. 16/698,545, filed Nov. 27, 2019, Richard N. Goldstein.
U.S. Appl. No. 16/698,567, filed Nov. 27, 2019, Takao Masuda et al.
Combined Chinese Office Action and Search Report issued Aug. 9, 2023 in Chinese Patent Application No. 201980077928.0, (with unedited computer-generated English translation), citing document 24 therein, 17 pages.
Xingping, L. "Physical Chemistry", Wuhan: Huazhong University of Science and Technology Press, Sep. 30, 2010, (with unedited computer-generated English translation), 5 pages.

* cited by examiner

FUNCTIONAL STRUCTURE

TECHNICAL FIELD

The present invention relates to a functional structure including supports (frameworks) with a porous structure and a functional material.

BACKGROUND ART

In a petrochemical complex, an oil refinery produces, from crude oil, a petrochemical raw material called naphtha and various fuels such as heavy oil, light oil, kerosene oil, gasoline, and LP gas. Crude oil, which is a mixture including the petrochemical raw material, the various fuels, and various impurities, needs to be subjected to a distillation process and a separation process for obtaining each component contained in crude oil.

The petroleum refining process heats crude oil at a plate column in an atmospheric distillation unit to separate components based on differences in the boiling point of the components, and concentrates each of the separated components. In this process, low boiling point materials such as LP gas and naphtha are removed at an upper plate column of the atmospheric distillation unit, and high boiling point materials such as heavy oil are removed at a bottom of the atmospheric distillation unit. Each separated and concentrated material is then subjected to a secondary process such as desulfurization so that various fuel products are obtained.

In general, the petroleum refining process uses a petroleum reforming catalyst to efficiently reform low boiling point materials such as naphtha into high octane number products such as gasoline. The naphtha fraction in crude oil is low octane number and is not suitable as gasoline for vehicles. The petroleum reforming catalyst is used to reform the paraffin and naphthene components with low octane number in the naphtha fraction into aromatic components with high octane number for the production of reformed gasoline with properties suitable for vehicle fuels.

The production of heavy oil from crude oil is followed by a process that includes subjecting the heavy oil to hydrodesulfurization using a hydrodesulfurization unit such as a direct or indirect sulfurization unit to obtain desulfurized heavy oil, desulfurized heavy gas oil, or the like, and then hydrocracking the desulfurized heavy oil, the desulfurized heavy gas oil, or the like to increase the production of desulfurized naphtha, desulfurized kerosene oil, desulfurized light oil, and so on. For example, atmospheric distillation residue oil is subjected to hydrocracking to increase the yield of the desulfurized kerosene oil fraction, the desulfurized light oil fraction, and the desulfurized naphtha fraction and to decrease the yield of the desulfurized heavy oil, and the desulfurized heavy oil is fed to a catalytic cracking unit to produce the LPG fraction, the FCC gasoline fraction, and the LCO fraction, so that the residual oil is decreased while the light oil fraction is increased. Catalysts proposed for this process include a catalyst having a crystalline aluminosilicate support which is typical zeolite, and a hydrocracking catalyst including zeolite and porous inorganic oxide at a prescribed ratio.

For example, a hydrocracking catalyst is disclosed (see Patent Document 1), which includes a support made of Y zeolite; and a metal material selected from Pd, Pt, Co, Fe, Cr, Mo, W, and mixtures thereof, which is deposited on the surface of the support.

In the field of automobiles, an exhaust-gas catalyst structure for diesel engine vehicles is proposed, which is a ceramic catalyst body using a ceramic support on a surface of a substrate ceramic and prepared by supporting a main catalyst component and a sub catalyst component on the ceramic support. In the ceramic catalyst body, the surface of the ceramic support made of γ-alumina has a large number of pores including lattice defects and so on in the crystal lattices, and the main catalyst component such as Ce—Zr or Pt is directly supported on or near the surface of the ceramic support (see Patent Document 2).

A known method for producing hydrocarbon compounds for use as raw materials for liquid fuel products, such as synthetic oils and synthetic fuels as alternative fuels to petroleum, involves the Fischer-Tropsch synthesis reaction (hereinafter, also referred to as "FT synthesis reaction") by which hydrocarbons, specifically liquid hydrocarbons, are catalytically produced from a synthesis gas composed mainly of carbon monoxide gas (CO) and hydrogen gas ($H_2$). Examples of the catalyst for use in the FT synthesis reaction include a catalyst disclosed in Patent Document 3, which includes an active metal such as cobalt or iron supported on a support such as silica or alumina, and a catalyst disclosed in Patent Document 4, which includes cobalt, zirconium, or titanium, and silica.

Patent Document 1: U.S. Published Patent Application Publication, No. 2016/0030934, Specification Patent Document 2: U.S. Published Patent Application Publication, No. 2003/0109383, Specification Patent Document 3: Japanese Unexamined Patent Application, Publication No. H04-227847

Patent Document 4: Japanese Unexamined Patent Application, Publication No. S59-102440

DISCLOSURE OF THE INVENTION

Problems to be Solved by the Invention

Unfortunately, in the catalyst structure mentioned above, the catalyst particles supported on or in the vicinity of the surface of the support can easily move in the support and undergo aggregation (sintering) due to an influence, such as force or heat, from a fluid material being reformed in the reform process. The aggregation of the catalyst particles causes a decrease in the effective surface area of the catalyst, which leads to a decrease in the catalytic activity and thus makes the life of the catalyst shorter than usual. This requires the catalyst structure to be replaced or refreshed at short time, which raises problems such as complicated replacement operation and failure of resource-saving. In general, petroleum reforming catalysts are attached to the downstream side of an atmospheric distillation unit and are used continuously in the petroleum refining process. Such catalysts are difficult to subject to a reactivation technique, and even if they can be subjected to a reactivation technique, its operation would be very complicated. Suppression or prevention of an aging deterioration in such function is a task to be addressed not only in the field of catalysts but also in other many technical fields, and there is a demand for a solution for long-term maintenance of function.

It is an object of the present invention to provide a functional structure including a functional material, which can resist a decrease in the function of the functional material and thus have a long life, can be free from the need for complicated replacement operation, can contribute to resource-saving, and can exhibit high catalytic activity, for example, when used as a catalyst.

Means for Solving the Problems

As a result of intensive studies for achieving the object, the inventors have found a functional structure including:

frameworks each having a porous structure and including a zeolite-type compound; and at least one functional material present in the frameworks, in which each of the frameworks has channels communicating with one another, the functional material is present at least in the channels of each of the frameworks, and the frameworks have an average external size of 20 µm or less, and have completed the present invention based on the findings that such a functional structure can resist a decrease in the function of the functional material, can have a long life, and can exhibit high catalytic activity when used, for example, as a catalyst.

Specifically, the present invention has the following principal features.

(1) A functional structure including: supports each having a porous structure and including a zeolite-type compound; and at least one functional material present in the supports, wherein each of the supports has channels communicating with one another, the functional material is present at least in the channels of each of the supports, and the supports have an average external size of 20 µm or less.
(2) The functional structure according to aspect (1), wherein the channels have any one of a one-dimensional pore, a two-dimensional pore, and a three-dimensional pore defined by framework structure of the zeolite-type compound, and have an enlarged pore portion different from the one-dimensional pore, the two-dimensional pore, and the three-dimensional pore, and the functional material is present at least in the enlarged pore portion.
(3) The functional structure according to aspect (2), wherein the enlarged pore portion connects a plurality of pores constituting any one of the one-dimensional pore, the two-dimensional pore, and the three-dimensional pore.
(4) The functional structure according to aspect (2) or (3), wherein the functional material has an average particle size larger than an average inner diameter of the channels and equal to or smaller than an inner diameter of the enlarged pore portion.
(5) The functional structure according to any one of aspects (1) to (4), wherein the functional material includes a catalytic material, and each of the supports carries at least one catalytic material.
(6) The functional structure according to aspect (5), wherein the catalytic material contains a metal element (M), and the metal element (M) is included in an amount from 0.5 to 2.5 mass % with respect to the functional structure.
(7) The functional structure according to any one of aspects (1) to (6), wherein the supports have an average external size of 50 nm or more and 1.00 µm or less.
(8) The functional structure according to any one of aspects (1) to (6), wherein the supports have a thickness of 0.05 µm or more and 0.60 µm or less.
(9) The functional structure according to any one of aspects (1) to (6), wherein the supports have a plate-like external shape, the supports have an average external size of more than 1.00 µm and 20.00 µm or less, and the supports have a ratio (L/D ratio) of maximum external size (L) to thickness (D) of 21.00 or less.
(10) The functional structure according to any one of aspects (5) to (9), wherein the catalytic material has an average particle size of 0.08 nm to 50 nm.
(11) The functional structure according to any one of aspects (5) to (10), wherein the ratio of the average particle size of the catalytic material to the average inner diameter of the channels is from 0.05 to 500.
(12) The functional structure according to any one of aspects (1) to (11), wherein the channels have an average inner diameter of 0.1 nm to 1.5 nm.
(13) The functional structure according to any one of aspects (1) to (12), further including at least one additional functional material held on an outer surface of the framework.
(14) The functional structure according to aspect (13), wherein the content of at least one functional material present in the framework is higher than the content of the at least one additional functional material held on the outer surface of the framework.
(15) The functional structure according to any one of aspects (1) to (14), wherein the zeolite-type compound is a silicate compound.

Effects of the Invention

The present invention makes it possible to provide a functional structure including a functional material, which can resist a decrease in the function of the functional material and thus have a long life, can be free from the need for complicated replacement operation, can contribute to resource-saving, and can exhibit high catalytic activity when used, for example, as a catalyst.

BRIEF DESCRIPTION OF THE DRAWINGS

FIGS. 1(a) and 1(b) are views schematically showing the inner structure of a functional structure according to an embodiment of the present invention, in which FIG. 1(a) is a perspective view (shown partially in transverse cross-sectional view), and FIG. 1(b) is a partially enlarged cross-sectional view.

FIGS. 2(a) and 2(b) are partially enlarged cross-sectional views for illustrating an example of the function of the functional structure shown in FIGS. 1(a) and 1(b), in which FIG. 2(a) is a view for illustrating a sieving function, and FIG. 2(b) is a view for illustrating a catalytic function.

PREFERRED MODE FOR CARRYING OUT THE INVENTION

Hereinafter, embodiments of the present invention will be described in detail regarding the drawings.

Configuration of Functional Structure

Figure 1A:
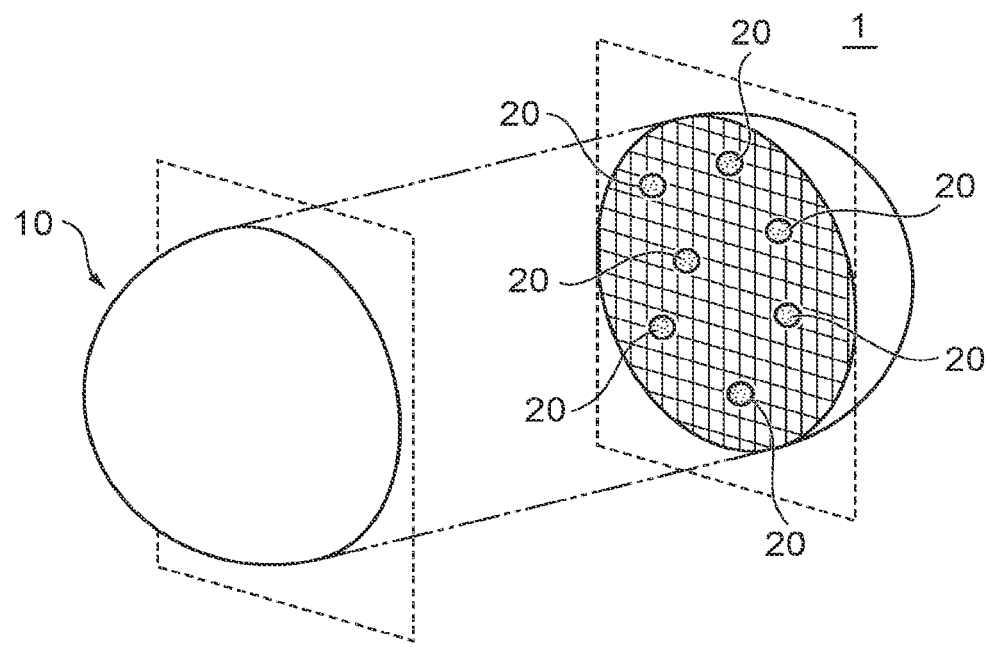
Figure 1B:
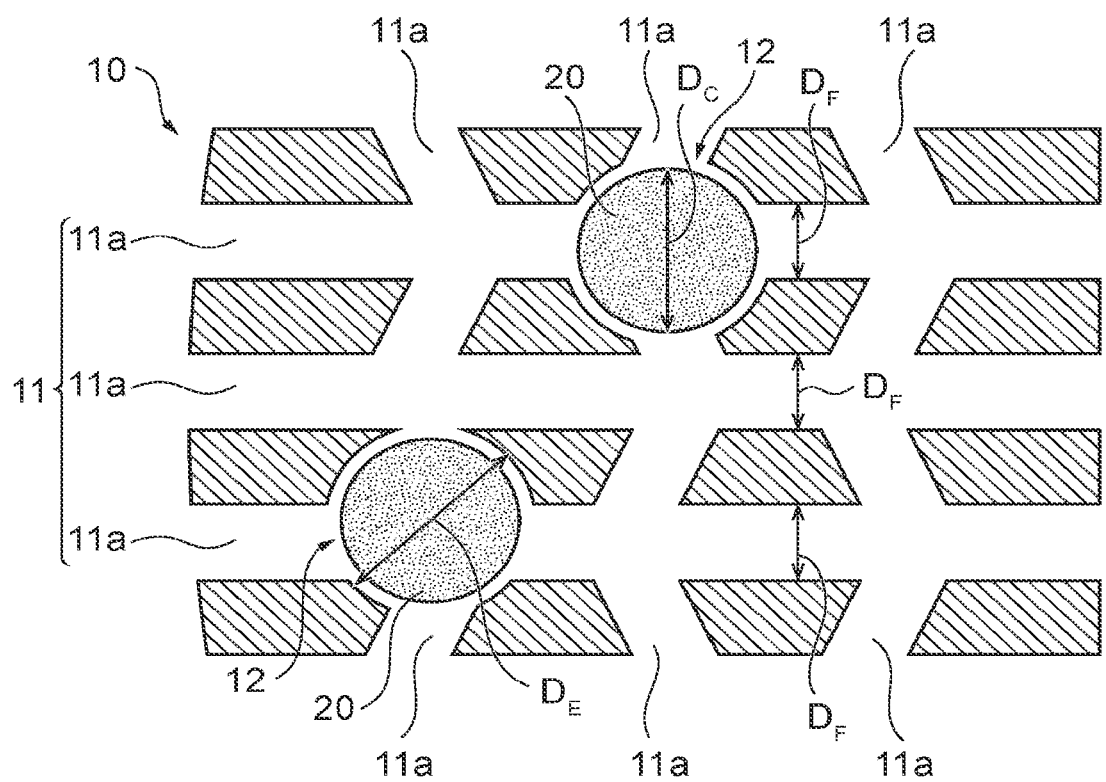

FIGS. 1(a) and 1(b) are views schematically showing the configuration of a functional structure according to an embodiment of the present invention, in which FIG. 1(a) is a perspective view (shown partially in transverse cross-sectional view), and FIG. 1(b) is a partially enlarged cross-sectional view. It should be noted that FIGS. 1(a) and 1(b) show only an example of the functional structure, and the configuration shown in FIGS. 1(a) and 1(b) such as shapes or dimensions are not intended to limit that of the present invention.

As shown in FIG. 1(a), a functional structure 1 includes frameworks 10 serving as supports each having a porous structure and including a zeolite-type compound, and at least one functional material 20 present in the frameworks 10.

The functional material 20 is a material that performs one or more functions alone or in cooperation with the framework 10. Examples of such a function include a catalytic function, a light emitting (fluorescence) function, a light absorbing function, and a discriminating function. The functional material 20 is preferably, for example, a catalytic material having a catalytic function. When the functional material 20 is a catalytic material, the framework 10 serves as a support that carries the catalytic material.

In the functional structure 1, a plurality of the functional material 20, 20, . . . are included in the porous structure of the framework 10. The catalytic material as an example of the functional material 20 is preferably in the form of at least one of a metal oxide fine particle and a metal fine particle. The metal oxide fine particle and the metal fine particle will be described later in detail. The functional material 20 may also be in the form of a particle including an oxide or an alloy of a certain metal or including a composite material of the oxide and the alloy.

The framework 10 has a porous structure, and as shown in FIG. 1(b), preferably has multiple pores a, 11a, . . . and channels 11 communicating with one another. The functional material 20 is present at least in the channel 11 of the framework 10 and is preferably held at least in the channel 11 of the framework 10.

Such a configuration restricts the movement of the functional material 20 in the framework 10 and effectively prevents aggregation of the functional materials 20, 20. This results in effective prevention of a decrease in the effective surface area of the functional material 20 and results in long-term retention of the function of the functional material 20. In other words, the functional structure 1 makes it possible to prevent a decrease in the function caused by aggregation of the functional materials 20, and to prolong the life of the functional structure 1. Moreover, due to the prolonged life of the functional structure 1, the frequency of replacement of the functional structure 1 can be reduced, and the amount of discarding of the used functional structure 1 can be greatly reduced, which leads to resource-saving.

In general, when the functional structure is used in a fluid (e.g., heavy oil, a reforming gas such as $NO_x$), the functional structure may receive an external force from the fluid. In such a case, if the functional material is held with only deposition state on the outer surface of the framework 10, there will be a problem in that, due to the influence of the external force from the fluid, the functional material can easily separate from the outer surface of the framework 10. On the other hand, in the functional structure 1, the functional material 20 is held at least in the channel 11 of the framework 10 and thus less likely to separate from the framework 10 even when receiving the influence of the external force from the fluid. Specifically, when the functional structure 1 is placed in the fluid, the fluid flowing into the channels 11 through the pores 11a of the framework 10 encounters flow channel resistance (frictional force), so that the velocity of the fluid flowing in the channel 11 would be lower than that of the fluid flowing on the outer surface of the framework 10. Due to the influence of such flow channel resistance, the pressure applied from the fluid onto the functional material 20 held in the channel 11 becomes lower than that applied from the fluid onto the functional material outside the framework 10. Therefore, the functional material 20 present in the framework 11 is effectively prevented from separating from the framework 11, and the function of the functional material 20 can be stably maintained for a long period of time. The flow channel resistance would be higher when the channel 11 of the framework 10 has multiple curves or branches and the interior of the framework 10 has a more complicated three-dimensional structure.

The frameworks 10 have an average external size of 20.00 µm or less. The framework 10, which has a porous structure and includes a zeolite-type compound, can provide a larger outer surface area (specific surface area) as the framework 10 has a smaller average external size. Such a configuration makes it easy for a reactive substrate to enter and pass through the pores, which increases the frequency of collision of the reactive substrate with the functional material 20 inside the framework 10 and enhances catalytic activity or adsorption property.

The term "average external size" refers to the average of the maximum lengths of 100 particles selected at random in a scanning electron microscope (SEM) observation, in which each of the maximum length is the maximum distance between two points on the edge of each of the particle (in the case of a plate-like particle, the maximum distance between two points on the edge of its largest surface corresponds to the "maximum external size (L)" mentioned below). The term "external shape" refers to the apparent shape of an SEM image obtained when a particle of the framework 10 is observed with SEM. In the case of zeolite having a "multifaceted columnar" shape, the term "external shape" is intended to also include coffin (casket) shape, for example, which are often observed in MFI zeolite.

The thickness (D) of the framework 10 is preferably, but not limited to, 0.02 µm or more, and more preferably 0.05 µm or more. The thickness (D) of the framework 10 is preferably 0.60 µm or less, more preferably 0.50 µm or less, even more preferably 0.44 µm or less, and further more preferably 0.30 µm or less. When the thickness (D) of the framework 10 falls within the range from 0.02 to 0.6 µm (in particular, the range from 0.05 to 0.50 µm), the functional structure 1 for use as a catalytic material can increase the catalytic activity.

The effective external shape of the framework 10 may vary with the average external size. For example, when the framework 10 has an average external size of more than 1.00 µm and 20.00 µm or less and has a plate-like external shape, the function of the functional structure 1 may be more strongly affected by the ratio (L/D ratio) of the maximum external size (L) to the thickness (D) than by the particle size. Specifically, the ratio (L/D ratio) of the maximum external size (L) to the thickness (D) is preferably 1 or more and 21 or less, more preferably 3 or more and 20 or less, and even more preferably 4 or more and 19 or less. When the ratio (L/D ratio) of the maximum external size (L) to the thickness (D) falls within the range mentioned above, the functional structure 1 including the framework 10 with such a configuration can have enhanced function (e.g., catalytic activity). The term "thickness" refers to the length in the height direction of a plate-like sample (the length in the direction perpendicular to the largest surface of a plate-like sample). The term "maximum external size" refers to the maximum distance between two points on the edge of the largest surface of a plate-like sample. The L/D ratio may be the average of the maximum external size/thickness ratios of 100 particles selected at random in SEM observation.

When the framework 10 has an average external size of about 1.0 µm or less, in particular, less than 1.00 µm, the average external size (L) will be substantially equal to the thickness (D), since the framework 10 has a nearly spherical shape. Thus, the average external size (L) and the thickness (D) can be usually measured as a particle size, which will strongly affect the function (e.g., catalytic activity) of the functional structure 1. In such a case, the terms "average external size (L)" and "thickness (D)" used herein represent "particle size". The average external size is preferably 50 nm or more and 1.00 µm or less, and more preferably 50 nm or more and 200 nm or less. When the framework 10 has an average external size within the range mentioned above, the zeolite-type compound can have a stable structure, the volume of the framework 10 can be kept in a prescribed range so that the area not used for the catalytic reaction can be reduced in the framework 10, and the dispersibility of a reactive substrate or an adsorption target which enters the pores of zeolite can be highly maintained. If the average external size is less than the range, the particles may tend to aggregate to form a large agglomerate, which may reduce the dispersibility of the substrate or the absorption target.

The channels 11 preferably have any one of a one-dimensional pore, a two-dimensional pore, and a three-dimensional pore, which are defined by the framework structure of the zeolite-type compound, and preferably have an enlarged pore portion 12 different from the one-dimensional pore, the two-dimensional pore, and the three-dimensional pore. In this case, the functional material 20 is preferably present at least in the enlarged pore portion 12 and more preferably included at least in the enlarged pore portion 12. As used herein, the term "one-dimensional pore" or "one-dimensional pores" refers to a tunnel-type or cage-type pore that forms a one-dimensional channel or refers to multiple tunnel-type or cage-type pores (multiple one-dimensional channels) that form multiple one-dimensional channels. The term "two-dimensional pore" refers to a two-dimensional channel in which multiple one-dimensional channels are connected two-dimensionally. The term "three-dimensional pore" refers to a three-dimensional channel in which multiple one-dimensional channels are connected three-dimensionally. According to this configuration, the movement of the functional material 20 is further restricted in the framework 10, and separation of the functional material 20 and aggregation of the functional materials 20, 20 are more effectively prevented. The state in which the functional material 20 is included in the porous structure of the framework 10 indicates that the functional material 20 is enclosed within the framework 10. In this regard, the functional material 20 and the framework 10 do not always have to be in direct contact with each other, and the functional material 20 may be indirectly held by the framework 10 with an additional material (e.g., a surfactant) provided between the functional material 20 and the framework 10.

FIG. 1(b) shows a case in which the functional material 20 is included in the enlarged pore portion 12. Such a configuration is non-limiting, and alternatively, the functional material 20 may be held in the channel 11 while partially protruding from the enlarged pore portion 12. Alternatively, the functional material 20 may be partially embedded in a portion of the channel 11 other than the enlarged pore portion 12 (e.g., an inner wall portion of the channel 11) or may be held by fixation or the like. The enlarged pore portion 12 preferably connects a plurality of pores 11a, 11a constituting any one of the one-dimensional pore, the two-dimensional pore, and the three-dimensional pore. According to the configuration, another channel different from the one-dimensional pore, the two-dimensional pore, or the three-dimensional pore is provided in the framework 10 to exert the function of the functional material 20 more effectively.

The channel 11 preferably has a three-dimensional structure including a branching portion or a junction portion inside the framework 10, and the enlarged pore portion 12 is preferably provided at the branching portion or the junction portion of the channel 11.

The average inner diameter $D_F$ of the channels 11 provided in the framework 10 is calculated from the average of the short diameter and the long diameter of the pores 11a constituting any one of the one-dimensional pore, the two-dimensional pore, and the three-dimensional pore. The average inner diameter $D_F$ of the channels 11 is typically from 0.1 nm to 1.5 nm and preferably from 0.5 nm to 0.8 nm. The inner diameter $D_E$ of the enlarged pore portion 12 is typically from 0.5 nm to 50 nm, preferably from 1.1 nm to 40 nm, and more preferably from 1.1 nm to 3.3 nm. The inner diameter $D_E$ of the enlarged pore portion 12 depends, for example, on the pore size of the precursor material (A) described later and the average particle size $D_C$ of the functional material 20 to be included. The inner diameter $D_E$ of the enlarged pore portion 12 is such that it is possible to include the functional material 20.

The framework 10 includes a zeolite-type compound. Examples of the zeolite-type compound include silicate compounds such as zeolite (aluminosilicate), cation-exchanged zeolite and silicalite, zeolite analogue compounds such as aluminoborate, aluminoarsenate and germanate, and phosphate-based zeolite analogue materials such as molybdenum phosphate. Among them, the zeolite-type compound is preferably a silicate compound.

The framework structure of the zeolite-type compound may be selected from FAU type (Y type or X type), MTW type, MFI type (ZSM-5), FER type (ferrierite), LTA type (A type), MWW type (MCM-22), MOR type (mordenite), LTL type (L type), BEA type (beta type), and so on, and is preferably MFI type. The zeolite-type compound has pores with a diameter (size) depending on the framework structure. For example, a maximum pore size of an MFI-type zeolite compound is 0.560 nm (5.60 Å) (see http://asia.iza-structure.org/IZA-SC/ftc_table.php).

Hereinafter, a detailed description will be provided of a case in which the functional material 20 is in the form of at least one of the metal oxide fine particle and the metal fine particle (hereinafter also generically referred to as "fine particle").

When the functional material 20 is in the form of a fine particle which may be a primary particle or a secondary particle resulting from the aggregation of the primary particles, the fine particle 20 preferably has an average particle size $D_C$ larger than the average inner diameter $D_F$ of the channels 11 and equal to or smaller than the inner diameter $D_E$ of the enlarged pore portion 12 ($D_F < D_C \leq D_E$). The fine particles 20 with such size are preferably included in the enlarged pore portions 12 in the channels 11, so that the movement of the fine particles 20 is restricted in the framework 10. Therefore, even when an external force is applied from a fluid to the fine particles 20, the movement of the fine particles 20 is suppressed in the framework 10, so that the fine particles 20, 20 ... respectively included in the enlarged pore portions 12 dispersed in the channels 11 of the framework 10 are effectively prevented from coming into contact with one another.

In the form of either a primary particle or a secondary particle, the functional material 20 in the form of the metal oxide fine particle preferably has an average particle size $D_C$ of from 0.1 nm to 50 nm, more preferably 0.1 nm or more and less than 30 nm, even more preferably from 0.4 nm to 14.0 nm, and further more preferably from 1.0 nm to 3.3 nm. The ratio ($D_C/D_F$) of the average particle size $D_C$ of the metal oxide fine particles 20 to the average inner diameter $D_F$ of the channels 11 is preferably from 0.06 to 500, more preferably from 0.1 to 36, even more preferably from 1.1 to 36, and further more preferably from 1.7 to 4.5.

When the functional material 20 is in the form of the metal oxide fine particle, the content of the metal element (M) of the metal oxide fine particles in the functional structure 1 is preferably from 0.5 to 7.6 mass %, more preferably from 0.5 to 6.9 mass %, even more preferably from 0.5 to 2.5 mass %, and most preferably from 0.5 to 1.5 mass % with respect to the mass of the functional structure 1. For example, when the metal element (M) is Co, the content (mass %) of the Co element is expressed by {(the mass of Co element)/(the mass of all elements in the functional structure 1)}×100.

The metal oxide fine particles only have to include a metal oxide. For example, the metal oxide fine particles may include a single metal oxide or a mixture of two or more metal oxides. The term "metal oxide" used herein to indicate the component (material) of the metal oxide fine particles is a generic term for an oxide or oxides containing at least one metal element (M), which is intended to include an oxide containing a single metal element (M) and a complex oxide containing two or more metal elements (M).

Examples of such a metal oxide include cobalt oxide ($CoO_x$), nickel oxide ($NiO_x$), iron oxide ($FeO_x$), copper oxide ($CuO_x$), zirconium oxide ($ZrO_x$), cerium oxide ($CeO_x$), aluminum oxide ($AlO_x$), niobium oxide ($NbO_x$), titanium oxide ($TiO_x$), bismuth oxide ($BiO_x$), molybdenum oxide ($MoO_x$), vanadium oxide ($VO_x$), and chromium oxide ($CrO_x$). The metal oxide fine particles are preferably composed mainly of one or more of oxides.

In the form of either a primary particle or a secondary particle, the functional material 20 in the form of the metal fine particle preferably has an average particle size $D_C$ of from 0.08 to 30 nm, more preferably 0.08 nm or more and less than 25 nm, even more preferably from 0.4 nm to 11.0 nm, and further more preferably from 0.8 nm to 2.7 nm. The ratio ($D_C/D_F$) of the average particle size $D_c$ of the metal fine particles 20 to the average inner diameter $D_F$ of the channels 11 is preferably from 0.05 to 300, more preferably from 0.1 to 30, even more preferably from 1.1 to 30, and further more preferably from 1.4 to 3.6.

When the functional material 20 is in the form of the metal fine particle, the content of the metal element (M) of the metal fine particles in the functional structure 1 is preferably from 0.5 to 7.6 mass %, more preferably from 0.5 to 6.9 mass %, even more preferably from 0.5 to 2.5 mass %, and further more preferably from 0.5 to 1.5 mass % with respect to the mass of the functional structure 1.

The metal fine particles only have to include metal which remains unoxidized. For example, the metal fine particles may include a single metal or a mixture of two or more metals. When used herein to indicate the component (material) of the metal fine particle, the term "metal" is a generic term for a metallic material including one or more metal elements, which is intended to include an elementary metal including a single metal element (M) and a metal alloy including two or more metal elements (M).

Examples of such metal include platinum (Pt), palladium (Pd), ruthenium (Ru), nickel (Ni), cobalt (Co), molybdenum (Mo), tungsten (W), iron (Fe), chromium (Cr), cerium (Ce), copper (Cu), magnesium (Mg), and aluminum (Al). The metal fine particles are preferably composed mainly of one or more of them.

In terms of durability, the functional material 20 is preferably in the form of the metal oxide fine particle.

The ratio (Si/M atomic ratio) of the number of silicon (Si) atoms in the framework 10 to the number of metal element (M) atoms in the fine particle 20 is preferably from 10 to 1000 and more preferably from 50 to 200. If the ratio is more than 1000, the effect of the functional material may not be a sufficient level, such as low activity. If the ratio is less than 10, the content of the fine particles 20 may be too high so that the strength of the framework 10 may tend to reduce. It should be noted that, the fine particles 20 described herein are the fine particles held or carried inside the framework 10 and are not intended to include the fine particles deposited on the outer surface of the framework 10.

Function of Functional Structure

As mentioned above, the functional structure 1 includes a framework 10 with a porous structure and at least one functional material 20 present in the framework 10. When the functional material 20 present in the framework of the functional structure 1 is brought into contact with a fluid, the function depending on the functional material 20 is exhibited. Specifically, a fluid coming into contact with the outer surface 10a of the functional structure 1 is allowed to flow into the interior of the framework 10 through a pore 11a formed at the outer surface 10a, then guided into the channels 11, and allowed to pass through the channels 11 and to flow out of the functional structure 1 through another pore 11a. When the functional material 20 held in the channel 11 comes into contact with the fluid passing through the channel 11, a reaction (e.g., catalytic reaction) depending on the function of the functional material 20 is caused. The functional structure 1 also has a molecular sieving ability since the framework has a porous structure.

Figure 2A:
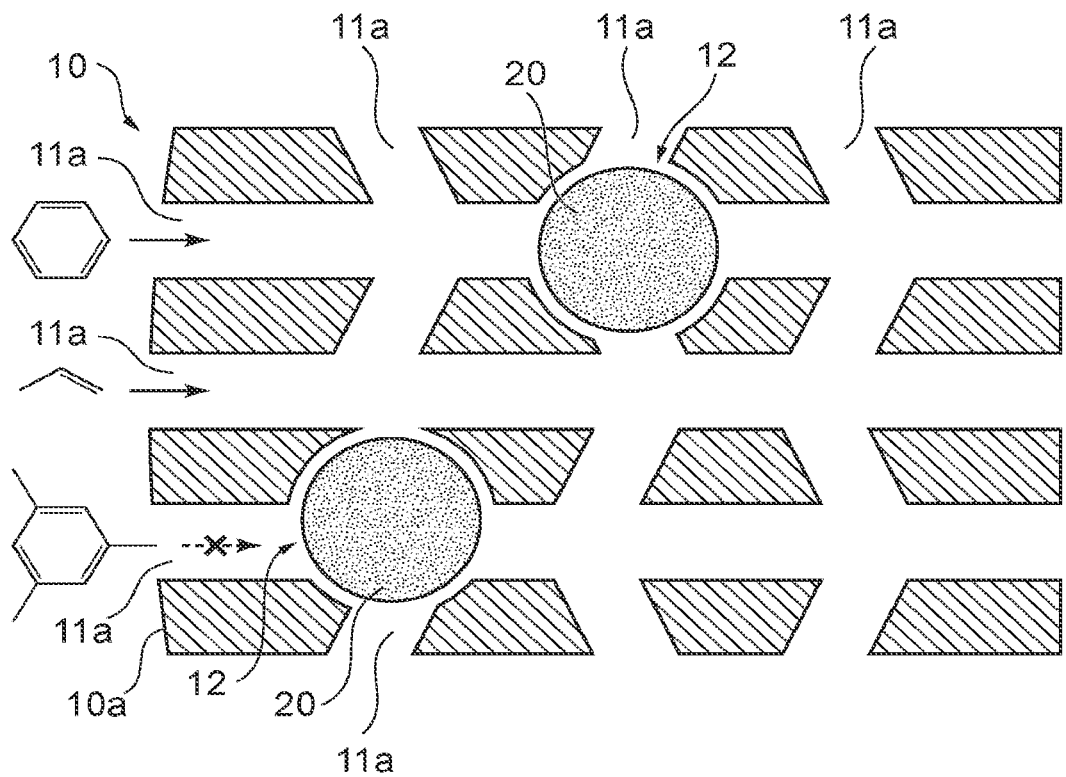

First, the molecular sieving ability of the functional structure 1 will be described with reference to FIG. 2(a) and an example in which the fluid is a liquid including benzene, propylene and mesitylene. As shown in FIG. 2(a), a compound (e.g., benzene or propylene) composed of molecule having size equal to or smaller than the diameter of the pore 11a, in other words, equal to or smaller than the inner diameter of the channel 11, can enter the framework 10. On the other hand, a compound (e.g., mesitylene) composed of molecule having size exceeding the diameter of the pore 11a cannot enter the framework 10. Accordingly, among multiple compounds in the fluid, some compounds not capable of entering the framework 10 are restricted from reacting, and some other compounds capable of entering the framework 10 are allowed to react.

Among compounds produced by reactions in the framework 10, only compound composed of molecule having size equal to or smaller than the diameter of the pore 11a can exit through the pore 11a to the exterior of the framework 10 to obtain as a reaction product. On the other hand, some compounds are not capable of exiting through the pore 11a to the exterior of the framework 10. If such compounds are converted into compounds composed of molecule having size that allow exit to the exterior of the framework 10, the compounds can exit to the exterior of the framework 10. As a result, the use of the functional structure 1 makes it possible to selectively obtain a specific reaction product.

Figure 2B:
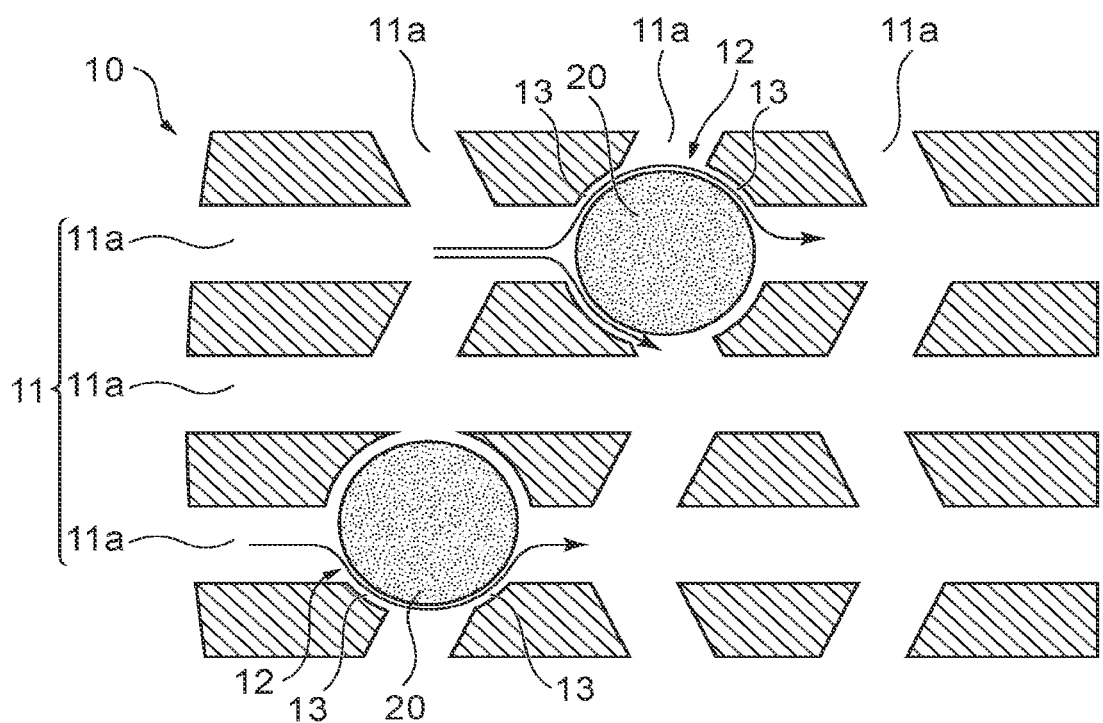

In the functional structure 1, the functional material 20 is preferably included in the enlarged pore portion 12 of the channel 11 as shown in FIG. 2(b). When the average particle size $D_C$ of the functional material 20 in the form of the metal oxide fine particle is larger than the average inner diameter $D_F$ of the channel 11 and smaller than the inner diameter $D_E$ of the enlarged pore portion 12 ($D_F<D_C<D_E$), a small channel 13 is provided between the metal oxide fine particle and the enlarged pore portion 12. In this case, as indicated by the arrow in FIG. 2(b), the fluid entering the small channel 13 comes into contact with the metal oxide fine particle. Each metal oxide fine particle included in the enlarged pore portion 12 is restricted from moving in the framework 10. Thus, the metal oxide fine particles are prevented from aggregating in the framework 10. As a result, a large contact area can be stably maintained between the metal oxide fine particles and the fluid.

Next, a description will be provided of a case in which the functional material 20 has a catalytic function. Specifically, a description will be provided of an example in which the functional material 20 is in the form of the iron oxide (FeO$_x$) fine particle and dodecylbenzene as a component of heavy oil is allowed to enter the framework 10 of the functional structure 1. When dodecylbenzene enters into the framework 10, dodecylbenzene is converted by oxidative decomposition reaction into alcohols and ketones as shown below. Benzene that is a component of light oil is also produced from a ketone (acetophenone in this case) one of the decomposition products. This means that the functional material 20 functions as a catalyst for oxidative decomposition reaction. In this manner, heavy oil can be converted to light oil using the functional structure 1. In conventional art, the hydrogenolysis process using hydrogen is performed to convert heavy oil to light oil. In contrast, using the functional structure 1 eliminates the need for hydrogen. In places with difficulty in hydrogen supply, therefore, the functional structure 1 is useful to convert heavy oil to light oil. Elimination of the need for hydrogen can reduce the cost, which is expected to promote the use of heavy oil having not been in full use.

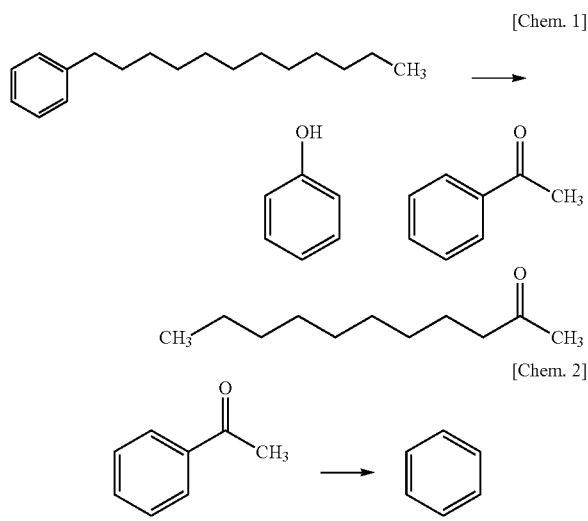

[Chem. 1]

[Chem. 2]

Method of Producing Functional Structure

Figure 3:
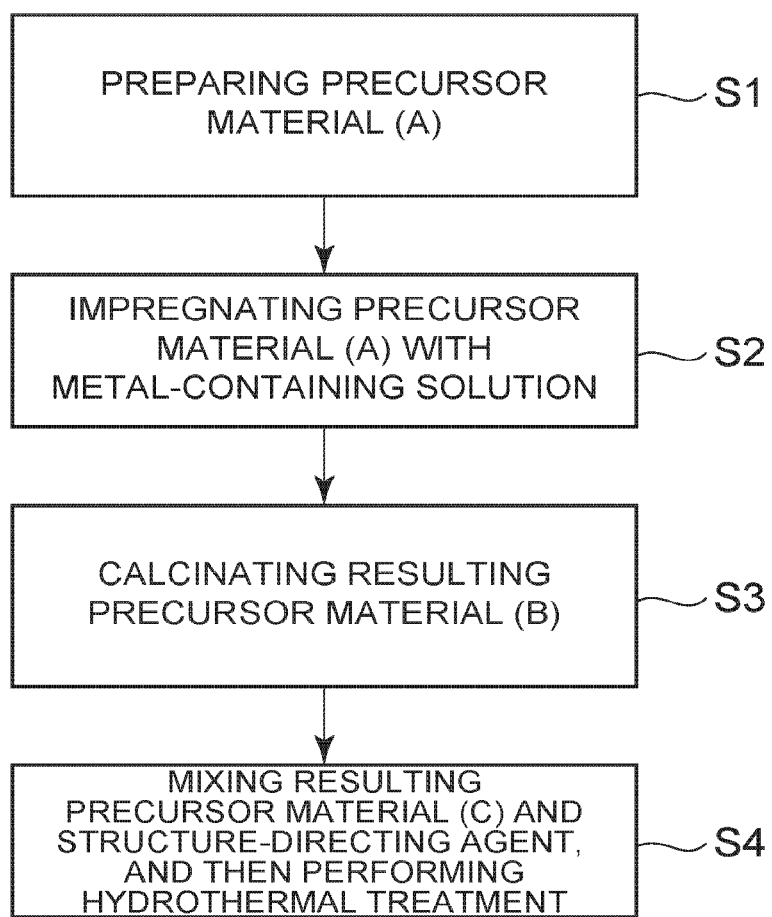
FIG. 3 is a flowchart showing an example of a method for producing the functional structure of FIGS. 1(a) and 1(b).

FIG. 3 is a flowchart showing a method of producing the functional structure 1 of FIGS. 1(*a*) and 1(*b*). Hereinafter, an example of the method for producing the functional structure containing the functional material in the form of the metal oxide fine particle present in the framework will be described.

Step S1: Preparation Step

As shown in FIG. 3, first, a precursor material (A) for obtaining a framework having a porous structure and including a zeolite-type compound is prepared. The precursor material (A) is preferably a regular mesoporous material, and may be appropriately selected depending on the type (composition) of the zeolite-type compound constituting the framework of the functional structure.

When the zeolite-type compound constituting the framework of the functional structure is a silicate compound, the regular mesoporous material is preferably a compound having a Si—O skeleton having pores with a pore size of from 1 to 50 nm uniformly and regularly developed one-dimensionally, two-dimensionally, or three-dimensionally. Such a regular mesoporous material is obtained as a variety of synthetic products depending on the synthesis conditions. Examples of such synthetic products include SBA-1, SBA-15, SBA-16, KIT-6, FSM-16, and MCM-41. In particular, MCM-41 is preferred. For reference, SBA-1 has a pore size of from 10 to 30 nm, SBA-15 has a pore size of from 6 to 10 nm, SBA-16 has a pore size of 6 nm, KIT-6 has a pore size of 9 nm, FSM-16 has a pore size of from 3 to 5 nm, and MCM-41 has a pore size of from 1 to 10 nm. Examples of such a regular mesoporous material include mesoporous silica, mesoporous aluminosilicate, and mesoporous metallosilicate.

The precursor material (A) may be a commercially available product or a synthetic product. The precursor material (A) may be synthesized using a known method for synthesizing a regular mesoporous material. For example, a mixture solution which contains a raw material containing constituent element of the precursor material (A) and a casting agent for controlling the structure of the precursor material (A) is prepared, the pH of the mixture solution is optionally adjusted, and the mixture solution is subjected to hydrothermal treatment (hydrothermal synthesis). Subsequently, the precipitate (product) resulting from the hydrothermal treatment is collected (e.g., filtered off), washed and dried if necessary, and then calcinated to obtain a precursor material (A) as a powdery regular mesoporous material. In this process, the solvent for the mixture solution may be, for example, water, an organic solvent such as alcohol, or a mixed solvent thereof. The raw material may be selected depending on the type of the framework. Examples of the raw material include silica agents such as tetraethoxysilane (TEOS), fumed silica, and quartz sand. The casting agent may be any of various surfactants and block copolymers. Various types of surfactants, block copolymers, and the like can be used as the casting agent. The casting agent is preferably selected depending on the type of the regular mesoporous material to be synthesized. For example, MCM-41 is produced, a surfactant such as hexadecyltrimethylammonium bromide is preferable. The hydrothermal treatment may be performed, for example, in a sealed vessel under conditions at from 80 to 800° C. and from 0 to 2000 kPa for from 5 hours to 240 hours. The calcining treatment may be performed, for example, in the air under conditions at from 350 to 850° C. for from 2 to 30 hours.

Step S2: Impregnation Step

Next, the prepared precursor material (A) is impregnated with a metal-containing solution to form a precursor material (B).

The metal-containing solution may be any solution containing a metal component (e.g., a metal ion) corresponding to the metal element (M) constituting the metal oxide fine particle of the functional structure. For example, the metal-containing solution may be prepared by dissolving, in a solvent, a metal salt containing the metal element (M). Examples of such a metal salt include chlorides, hydroxides, oxides, sulfates, and nitrates, among which nitrates are preferred. The solvent may be, for example, water, an organic solvent such as alcohol, or a mixed solvent thereof.

Any method may be used to impregnate the precursor material (A) with the metal-containing solution. For example, before the calcination step described later, the impregnation is preferably performed by adding the metal-containing solution little by little in multiple portions to the powdery precursor material (A) being stirred. In order to allow the metal-containing solution to more easily enter into the pores of the precursor material (A), a surfactant is preferably added as an additive in advance before the addition of the metal-containing solution. Such an additive can act to cover the outer surface of the precursor material (A) and thus to inhibit the adhesion of the metal-containing solution on the outer surface of the precursor material (A), so that the metal-containing solution subsequently could easily enter into the pores of the precursor material (A).

Examples of such an additive include nonionic surfactants such as polyoxyethylene oleyl ether, polyoxyethylene alkyl ether, and polyoxyethylene alkyl phenyl ether. These surfactants have a large molecular size and thus cannot enter into the pores of the precursor material (A), which suggests that the surfactants will not adhere to the interior of the pores and will not hinder the entering the metal-containing solution into the pores. A method of adding the nonionic surfactant preferably includes, for example, adding from 50 to 500 mass % of the nonionic surfactant to the precursor material (A) before the calcination step described later. If the addition amount of the nonionic surfactant to the precursor material (A) is less than 50 mass %, the inhibiting effect may be difficult to achieve, and if the addition amount of the nonionic surfactant to the precursor material (A) is more than 500 mass %, undesirably high viscosity may be reached. Therefore, the addition amount of the nonionic surfactant to the precursor material (A) is set to a value within the above range.

Preferably, the addition amount of the metal-containing solution added to the precursor material (A) is appropriately adjusted in view of the amount of the metal element (M) contained in the metal-containing solution with which the precursor material (A) is to be impregnated (in other words, the amount of the metal element (M) to be present in the precursor material (B)). Before the calcination step described later, for example, the addition amount of the metal-containing solution added to the precursor material (A) is preferably adjusted such that the ratio (Si/M atomic ratio) of the number of silicon (Si) atoms in the precursor material (A) to the number of the metal element (M) atoms contained in the metal-containing solution is set to from 10 to 1000 and more preferably from 50 to 200. For example, when a surfactant is added as an additive to the precursor material (A) before the addition of the metal-containing solution to the precursor material (A), the addition amount of the metal-containing solution added to the precursor material (A) may be adjusted such that the calculated Si/M atomic ratio can be from 50 to 200. In such a case, the content of the metal element (M) of the metal oxide fine particles can be adjusted from 0.5 to 7.6 mass % based on the functional structure. In the state of the precursor material (B), the content of the metal element (M) present within the porous is generally proportional to the addition amount of the metal-containing solution added to the precursor material (A) as long as the metal concentration of the metal-containing solution, the presence or absence of the additive, and other conditions such as temperature and pressure remain constant. The amount of the metal element (M) present in the precursor material (B) is also proportional to the amount of the metal element constituting the metal oxide fine particles present in the framework of the functional structure. Accordingly, when the addition amount of the metal-containing solution added to the precursor material (A) is controlled within the above range, the pores of the precursor material (A) can be sufficiently impregnated with the metal-containing solution, which makes it possible to adjust the content of the metal oxide fine particles present in the framework of the functional structure.

After the precursor material (A) is impregnated with the metal-containing solution, washing treatment may be performed if necessary. The washing liquid used may be water, an organic solvent such as alcohol, or a mixed solution thereof. Drying treatment is also preferably performed after the impregnation of the precursor material (A) with the metal-containing solution and then optionally after the washing treatment. The drying treatment may include natural drying overnight or so or drying at a high temperature of 150° C. or less. The drying is preferably performed thoroughly because the framework structure of the precursor material (A) as the regular mesoporous material may collapse if the calcination treatment described later is performed while a large amount of water contained in the metal-containing solution or in the washing liquid remains in the precursor material (A).

Step S3: Calcination Step

Next, the precursor material (B) is calcinated to form a precursor material (C). The precursor material (B) is a product obtained through impregnating, with the metal-containing solution, the precursor material (A) for forming the framework having a porous structure and including the zeolite-type compound.

The calcining is preferably carried out, for example, in the air under conditions at from 350 to 850° C. for 2 to 30 hours. Such calcination treatment allows the growth of crystals of the metal component entering into the pores for the regular mesoporous material, so that the metal oxide fine particles are formed in the pores.

Step S4: Hydrothermal Treatment Step

Then, a mixture solution of the precursor material (C) and a structure-directing agent is prepared, and the precursor material (C) obtained by calcining the precursor material (B) is subjected to hydrothermal treatment to obtain a functional structure.

The structure-directing agent is a casting agent for directing the framework structure of the framework of the functional structure. The structure-directing agent may be, for example, a surfactant. The structure-directing agent is preferably selected depending on the framework structure of the framework of the functional structure, and preferred examples thereof include a surfactant such as tetramethylammonium bromide (TMABr), tetraethylammonium bromide (TEABr), or tetrapropylammonium bromide (TPABr).

The precursor material (C) and the structure-directing agent may be mixed during or before the hydrothermal treatment step. Any method may be used to prepare the mixture solution. The precursor material (C), the structure-directing agent, and the solvent may be mixed at the same time, or the precursor material (C) and the structure-directing agent may be separately dispersed into individual solvents and then the resulting dispersion solutions may be mixed. The solvent may be, for example, water, an organic solvent such as alcohol, or a mixed solvent thereof. Before the hydrothermal treatment, the mixture solution is preferably subjected to pH adjustment using an acid or a base.

The hydrothermal treatment may be carried out using a known method, which is preferably performed in a sealed vessel under conditions at from 80 to 800° C. and from 0 to 2000 kPa for 1 hour to 240 hours. The hydrothermal treatment is also preferably performed in a basic atmosphere.

Although the reaction mechanism is not necessarily clear, the hydrothermal treatment using the precursor material (C) as a raw material can gradually destroy the framework structure of the precursor material (C) as the regular mesoporous material but can form a new framework structure (porous structure) for the framework of the functional structure due to the action of the structure-directing agent while the position of the metal oxide fine particles in the pores of the precursor material (C) substantially remains. The resulting functional structure includes a framework of a porous structure and metal oxide fine particles present in the framework, in which the framework has channels connecting multiple pores derived from the porous structure, and at least some of the metal oxide fine particles are held in the channel of the framework.

The average external size (L) and thickness (D) of the zeolite compound can be controlled by appropriately adjusting the duration of the hydrothermal treatment. At the initial growth stage, since both of the average external size (L) and the thickness (D) of the zeolite compound are grown as crystal growth, both of the average external size (L) and the thickness (D) are increased. When the hydrothermal treatment time is prolonged for further advancing the crystal growth, the average external size (L) will increase more preferentially than the thickness (D) after the constant growth of crystals. This behavior may be used to control the average external size (L) and thickness (D) of the zeolite compound.

In the embodiment of the hydrothermal treatment step, the mixture solution of the precursor material (C) and the structure-directing agent is prepared, and then the precursor material (C) is subjected to hydrothermal treatment. However, the hydrothermal treatment step is non-limited, the precursor material (C) may be hydrothermally treated without being mixed with the structure-directing agent and the precursor material (C).

Preferably, the precipitate (functional structure) resulting from the hydrothermal treatment is collected (e.g., filtered off) and then optionally washed, dried, and calcinated. The washing liquid may be water, an organic solvent such as alcohol, or a mixed solution thereof. The drying treatment may include natural drying overnight or so or drying at a high temperature of 150° C. or less. The drying is preferably performed thoroughly because the framework structure of the functional structure as the framework may collapse if the calcination treatment is performed while a large amount of water remains in the precipitate. The calcination treatment may be performed, for example, in the air under conditions at from 350 to 850° C. for 2 to 30 hours. During such calcination treatment, the structure-directing agent is burned away from the functional structure. Depending on the intended use, the functional structure may be used as it is without undergoing the calcination treatment of the collected precipitate. For example, when the functional structure is used in a high-temperature oxidative atmosphere environment, the structure-directing agent will be burned away by exposing the functional structure to the usage environment for a certain period of time. In such a case, the resulting functional structure can be used without any modification since such a functional structure is substantially the same as that obtained after the calcination treatment.

While an example of the method of producing a functional structure including the metal oxide fine particle as the functional material has been described, a functional structure including the metal fine particle as the functional material can also be produced in an almost similar manner. For example, a functional structure including a framework and the metal fine particles in the framework can be obtained by a process that includes obtaining, as shown above, the functional structure including the metal oxide fine particles and then reducing the obtained functional structure in a reducing gas atmosphere such as hydrogen gas. In this case, the metal oxide fine particles present in the framework are reduced into the metal fine particles which correspond to the metal element (M) of the metal oxide fine particles. Alternatively, an oxidation-resistant metal species (e.g., noble metal) may be used as the metal element (M) contained in the metal-containing solution with which the precursor material (A) is to be impregnated. In this case, the calcination step (step S3) allows crystal growth to form the metal fine particles, which may be followed by hydrothermal treatment to form a functional structure including a framework and the metal fine particles present in the framework.

Modifications of Functional Structure 1

Figure 4:
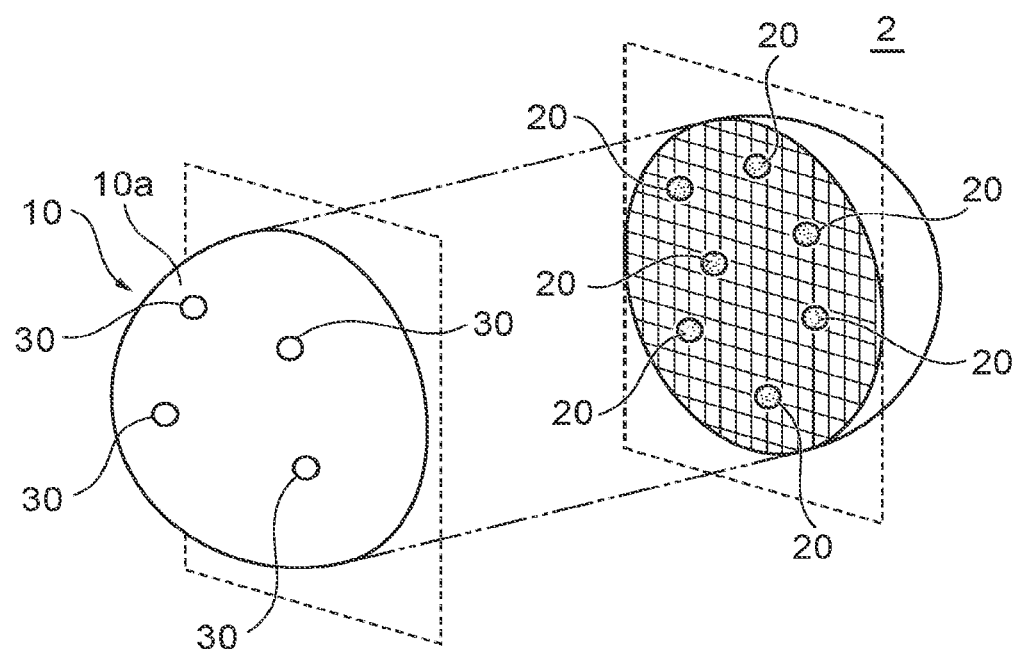
FIG. 4 is a schematic view showing a modification of the functional structure of FIGS. 1(a) and 1(b).

FIG. 4 is a schematic view showing a modification of the functional structure 1 of FIGS. 1(a) and 1(b). The functional structure 1 shown in FIGS. 1(a) and 1(b) includes the framework 10 and the functional material 20 present in the framework 10. Such a structure is non-limiting, and, as shown in FIG. 4, for example, a functional structure 2 may further include an additional functional material 30 held on an outer surface 10a of the framework 10.

The functional material 30 can perform one or more functions. The function of the additional functional material 30 may be the same as or different from that of the functional material 20. Examples of the function of the additional functional material 30 may be the same as that of the functional material 20. In particular, the additional functional material 30 is preferably a catalytic material having a catalytic function. When both of the functional materials 20 and 30 have the same function, a material of the additional functional material 30 may be the same as or different from that of the functional material 20. According to the configuration, the content of the functional material held on the functional structure 2 can be increased, which further enhances the function of the functional material.

In this case, the content of the functional material 20 present in the framework 10 is preferably higher than the content of the additional functional material 30 held on the outer surface 10a of the framework 10. In such a case, the function of the functional material 20 held inside the framework 10 can be dominant, and the function of the functional materials can be stably exhibited.

While the functional structures according to embodiments of the present invention have been described, it will be understood that the embodiments are not intended to limit the present invention and may be altered or modified in various ways based on the technical idea of the present invention.

EXAMPLES

Examples 1 to 11

Synthesis of Precursor Material (A)

An aqueous solution of a mixture of a silica agent (tetraethoxysilane (TEOS) manufactured by Wako Pure Chemical Industries, Ltd.) and a surfactant as a casting agent was prepared, then subjected to pH adjustment as needed, and then hydrothermally treated in a sealed vessel at from 80 to 350° C. for 100 hours. Subsequently, the produced precipitate was filtered off, then washed with water and ethanol, and then calcinated in the air at 600° C. for 24 hours to obtain a precursor material (A) of the type and pore size shown in Table 1. The following surfactant was used according to the type of the precursor material (A) ("Type of precursor material (A): surfactant").

MCM-41: Hexadecyltrimethylammonium bromide (CTAB) (manufactured by Wako Pure Chemical Industries, Ltd.)

Preparation of Precursor Materials (B) and (C)

Next, depending on the type of the metal element (M) constituting the metal oxide fine particles shown in Table 1, a metal salt containing the metal element (M) was dissolved in water to prepare a metal-containing aqueous solution. The following metal salt was used according to the type of the metal oxide fine particles ("Metal oxide fine particle: metal salt").

$CoO_x$: Cobalt nitrate (II) hexahydrate (manufactured by Wako Pure Chemical Industries, Ltd.)

Subsequently, the metal-containing aqueous solution was added little by little in multiple portions to the powdery precursor material (A), and the resulting product was then dried at room temperature (20° C.±10° C.) for at least 12 hours to obtain the precursor material (B).

It should be noted that, regarding the presence or absence of an additive shown in Table 1, when the additive was "present", the followings were performed. Pretreatment was performed in which an aqueous solution of polyoxyethylene (15) oleyl ether (NIKKOL BO-15V, manufactured by Nikko Chemicals Co., Ltd.) as an additive was added to the precursor material (A) before the addition of the metal-containing aqueous solution, and then the metal-containing aqueous solution was added as shown above to the resulting product.

The addition amount of the metal-containing aqueous solution added to the precursor material (A) was adjusted such that the calculated ratio (Si/M atomic ratio) of the silicon (Si) content of the precursor material (A) to the metal element (M) content of the metal-containing aqueous solution was as shown in Table 1.

Subsequently, the resulting precursor material (B) impregnated with the metal-containing aqueous solution was calcinated in the air at 550° C. for 12 hours to obtain the precursor material (C).

Synthesis of Functional Structure

An aqueous solution of a mixture of the resulting precursor material (C) and the structure-directing agent shown in Table 1 was prepared and then hydrothermally treated in a sealed vessel at from 80 to 350° C. under the pH and time conditions shown in Table 1. Subsequently, the produced precipitate was filtered off, then washed with water, then dried at 100° C. for at least 12 hours, and then calcinated in the air at 550° C. for 24 hours. Subsequently, the calcinated product was collected and then subjected to reduction treatment under hydrogen gas stream at 400° C. for 350 minutes to obtain the functional structure including the framework and the metal fine particles as the functional material as shown in Table 1 (Examples 1 to 11).

Comparative Example 1

In Comparative Example 1, MFI type silicalite was mixed with cobalt oxide powder with an average particle size equal to or less than 50 nm (II, III manufactured by Sigma-Aldrich Japan), and the reduction treatment in which the cobalt oxide fine particles as a functional material were deposited on the outer surface of the silicalite as a framework was performed to obtain a functional structure carrying cobalt particles. The MFI type silicalite was synthesized in the same manner as in Example 1, except for the step of adding the metal.

Evaluation

The functional structures of the examples and the silicalite of the comparative example were evaluated for the various characteristics under the conditions shown below.

(A) Cross-Sectional Observation

Samples for observation were prepared by pulverization treatment from the functional structures of the examples and the cobalt fine particles-carrying silicalite of Comparative Example 1. The cross-section of each sample was observed using a transmission electron microscope (TEM) (TITAN G2 manufactured by FEI Company).

As a result, in the functional structure of each of the examples, the functional material was found to be present and held inside the framework composed of silicalite or zeolite. On the other hand, in the silicalite of Comparative Example 1, the functional material was found to be deposited only on the outer surface of the framework and not found present in the framework.

Among the functional structures of the examples, the functional structure containing the cobalt oxide fine particles ($CoO_x$) as a metal oxide was subjected to cross-section cutting by use of focused ion beam (FIB) processing. The resulting cross-section was subjected to elemental analysis by use of SEM (SU8020 manufactured by Hitachi High Technologies Co., Ltd.) and energy dispersive X-ray spectroscopy (EDX) (X-Max manufactured by Horiba, Ltd.). As a result, Co element was detected from the inside of the framework.

The results of the cross-sectional observation by use of TEM and SEM/EDX revealed the existence of the cobalt oxide fine particles inside the framework.

(B) Average Inner Diameter of Channels of Framework and Average Particle Size of Functional Material Any 500 channels of the framework were selected in the TEM image taken during the cross-sectional observation performed for the above evaluation (A). The long diameter and the short diameter of each of the channels were measured. The measured values were averaged to calculate the inner diameter of each channel (N=500), and the calculated inner diameters were averaged as the average inner diameter $D_F$ of the channels of the framework. Table 1 shows the results.

Small angle X-ray scattering (SAXS) analysis was also performed to confirm the average particle size and the dispersed state of the functional material. The SAXS measurement was carried out using the beamline BL19B2 of Spring-8. The resulting SAXS data were subjected to fitting by Guinier approximation method using a spherical model to determine the particle size. For comparison, commercially available cobalt oxide fine particles (manufactured by Wako) were observed and measured using SEM.

The results were as follows. In the commercially available product, the cobalt oxide fine particles were found at random with different particle sizes in the range of about 50 nm or less. On the other hand, in the functional structure of each of the examples, the cobalt oxide fine particles as a functional material were found to have a narrow range of particle sizes with an average particle size of 2.50 nm and to be extremely highly dispersed inside the framework.

The scanning electron microscope (SEM) observation also revealed that the framework had a plate-like external shape. The SEM observation was also used to determine the average external size of the framework and the ratio (L/D ratio) of the maximum external size (L) of the framework to the thickness (D) of the framework. Specifically, 100 framework particles were selected at random as measurement targets, and the maximum external size (L) was measured as the maximum distance between two points on the edge of the largest surface of each of the framework particles. The thickness (D) was also measured as the length in the direction perpendicular to the largest surface of each of the framework particles. The average external size was calculated as the average of the maximum external sizes (L) of the 100 framework particles. The ratio (L/D ratio) of the maximum external size (L) to the thickness (D) was calculated as the average of the ratios between the maximum external sizes (L) and the thicknesses (D) of the 100 framework particles. The measurement was performed at magnifications depending on the external size of one particle, which specifically ranged from 2,500 magnifications to 300000 magnifications (e.g., 10000 magnifications for 1 μm).

(C) Relationship Between the Addition Amount of Metal-Containing Solution and the Content of Metal Included in Framework Functional structures having the metal oxide fine particles included inside the framework were prepared with an additional amount corresponding to an Si/M atomic ratio of 100 (M=Co). Subsequently, the functional structures prepared with the addition amount were measured for the content (mass %) of the metal included in the framework.

The method for quantitatively determining the metal content was performed using inductively coupled plasma (ICP) alone or a combination of ICP and X-ray fluorescence (XRF) analysis. XRF analysis (using energy dispersive X-ray fluorescence analyzer SEA1200VX manufactured by SII Nanotechnology Inc.) was carried out in a vacuum atmosphere under conditions at an acceleration voltage of 15 kV (using a Cr filter) or an acceleration voltage of 50 kV (using a Pb filter).

XRF is a method for determining the metal content by the fluorescence intensity, and XRF alone cannot quantitatively determine the metal content (in terms of mass %). Therefore, ICP analysis was used to quantify the content of metal in the functional structure containing metal in such an amount that the Si/M atomic ratio was 100, and the result of XRF measurement and the result of ICP measurement were used to determine the content of metal in the functional structure containing metal in such an amount that the Si/M atomic ratio was 50 or less than 100.

(1) Catalytic Activity

Catalytic activity was evaluated under the conditions shown below. First, an atmospheric pressure flow reactor was filled with 70 mg of the catalyst structures. While hydrogen (8 mL/min) and carbon monoxide (4 mL/min) were supplied to the reactor, FT synthesis reaction was carried out with heating from 100 to 700° C. at 0.1 MPa for 1 hour. The used atmospheric pressure flow reactor was a single microreactor (Rx-3050SR available from Frontier Laboratory).

After the completion of the reaction, the generated gas and the generated liquid that were collected were subjected to component analysis using gas chromatography-mass spectrometry (GC/MS). As the analysis apparatus, TRACE 1310GC (manufactured by Thermo Fisher Scientific Inc., detector: thermal conductivity detector) was used.

Based on the results of the analysis, the basis gas (CO) conversion rate at 250° C. was calculated. A basis gas conversion rate of 20% or more was evaluated as excellent catalytic activity (⊚) for FT synthesis reaction, a basis gas conversion rate of 9% or more and less than 20% was evaluated as good catalytic activity (o), a basis gas conversion rate of 3% or more and less than 9% was evaluated as not good but acceptable catalytic activity (Δ), and a basis gas conversion rate of less than 3% was evaluated as poor (unacceptable) catalytic activity (x).

Table 1 shows that the catalyst structures (Examples 1 to 11), found to hold the catalytic material inside the support in the cross-sectional observation, have higher catalytic activity for FT synthesis reaction than the catalyst structure (Comparative Example 1) having the catalytic material only deposited on the outer surface of the support.

TABLE 1

| | Conditions for production of functional structure | | | | | | | Functional structure Framework | |
|---|---|---|---|---|---|---|---|---|---|
| | Precursor material (A) | | Addition to precursor material (A) | Calculated ratio (atomic ratio) for addition amount of metal-containing solution Si/M | Conditions for hydrothermal treatment using precursor material (C) | | | Zeolite-type compound | |
| No. +C2: R13S3 CC2:S15 | Type | Pore size (nm) | Presence or absence of additive | | Type of structure-directing agent | pH | Time (h) | Structure | Average external size (μm) |
| Example 1 | MCM-41 | 2.5 | Present | 100 | TPABr | 12 | 1 | MFI | 0.02 |
| Example 2 | MCM-41 | 2.5 | Present | 100 | TPABr | 12 | 3 | MFI | 0.05 |
| Example 3 | MCM-41 | 2.5 | Present | 100 | TPABr | 12 | 5 | MFI | 0.2 |
| Example 4 | MCM-41 | 2.5 | Present | 100 | TPABr | 12 | 10 | MFI | 0.5 |
| Example 5 | MCM-41 | 2.5 | Present | 100 | TPABr | 12 | 24 | MFI | 1 |
| Example 6 | MCM-41 | 2.5 | Present | 100 | TPABr | 12 | 48 | MFI | 5 |
| Example 7 | MCM-41 | 2.5 | Present | 100 | TPABr | 12 | 55 | MFI | 5 |
| Example 8 | MCM-41 | 2.5 | Present | 100 | TPABr | 12 | 62 | MFI | 9 |
| Example 9 | MCM-41 | 2.5 | Present | 100 | TPABr | 12 | 64 | MFI | 9 |
| Example 10 | MCM-41 | 2.5 | Present | 100 | TPABr | 12 | 65 | MFI | 15 |
| Example 11 | MCM-41 | 2.5 | Present | 100 | TPABr | 12 | 70 | MFI | 19 |
| Comparative Example 1 | | | | — | | | | MFI type silicalite | — |

TABLE 1-continued

| | Functional structure | | | | | |
|---|---|---|---|---|---|---|
| | Framework Zeolite-type compound | | Functional material | | | Performance evaluation |
| | Maximum external | Average inner | Metal oxide fine particle | | | Catalytic activity (FT |
| No. +C2: R13S3CC2: S15 | Thickness (μm) | size (L)/ thickness (D) (—) | diameter $D_F$ of channels (nm) | Type | Average particle size $D_C$ (nm) | $D_C/D_F$ | synthesis reaction conversion rate) |
| Example 1 | 0.02 | 1.00 | 0.56 | CoOx | 2.50 | 4.5 | ○ |
| Example 2 | 0.05 | 1.00 | 0.56 | CoOx | 2.50 | 4.5 | ⊚ |
| Example 3 | 0.2 | 1.00 | 0.56 | CoOx | 2.50 | 4.5 | ⊚ |
| Example 4 | 0.5 | 1.00 | 0.56 | CoOx | 2.50 | 4.5 | ○ |
| Example 5 | 1 | 1.00 | 0.56 | CoOx | 2.50 | 4.5 | Δ |
| Example 6 | 0.3 | 16.67 | 0.56 | CoOx | 2.50 | 4.5 | ○ |
| Example 7 | 5 | 1.00 | 0.56 | CoOx | 2.50 | 4.5 | Δ |
| Example 8 | 0.44 | 20.45 | 0.56 | CoOx | 2.50 | 4.5 | ○ |
| Example 9 | 0.6 | 15.00 | 0.56 | CoOx | 2.50 | 4.5 | Δ |
| Example 10 | 4 | 3.75 | 0.56 | CoOx | 2.50 | 4.5 | Δ |
| Example 11 | 5 | 3.80 | 0.56 | CoOx | 2.50 | 4.5 | Δ |
| Comparative Example 1 | — | | | CoOx | ≤50 | ≤67.6 | X |

EXPLANATION OF REFERENCE NUMERALS

1: Functional structure
10: Framework
10a: Outer surface
11: Channel
11a: Pore
12: Enlarged pore portion
20: Functional material
30: Functional material
$D_C$: Average particle size
$D_F$: Average inner diameter
$D_E$: Inner diameter

The invention claimed is:

1. A functional structure comprising:
a support that has a porous structure and comprises a zeolite-type compound; and
a functional material present in the support, wherein
the support has channels communicating with one another,
the channels have any one of a one-dimensional pore, a two-dimensional pore, a three-dimensional pore of a framework structure of the zeolite-type compound, and an enlarged pore portion which is not defined by the framework structure of the zeolite-type compound and has a diameter greater than any one of the one-dimensional pore, the two-dimensional pore, and the three-dimensional pore,
the enlarged pore portion has a greater diameter than the functional material,
the functional material has a diameter greater than any one of the one-dimensional pore, the two-dimensional pore and the three-dimensional pore,
the functional material is present at least in the channels of the support,
the supports are present in the form of particles having an average external size of 20 μm or less,
the zeolite-type compound has a framework structure that is selected from the group consisting of FAU type, MTW type, MFI type, FER type, LTA type, MWW type, MOR type, LTL type, and BEA type,
the functional material includes metal oxide nanoparticles,
the functional material is present in the enlarged pore portion, and
the functional structure is obtained by:
impregnating a precursor material (A), which is a regular mesoporous material, with a metal-containing solution to form a precursor material (B), the precursor material (A) being a compound having a Si—O skeleton having pores with a pore size of 1.0 nm or more and 50.0 nm or less uniformly and regularly developed one-dimensionally, two-dimensionally, or three-dimensionally,
calcinating the precursor material (B) to form a precursor material (C),
preparing a mixture solution of the precursor material (C) and a structure-directing agent, and
subjecting the mixture solution to a hydrothermal treatment to obtain the functional structure.

2. The functional structure according to claim 1, wherein the enlarged pore portion connects a plurality of pores constituting any one of the one-dimensional pore, the two-dimensional pore, and the three-dimensional pore.

3. The functional structure according to claim 1, wherein the functional material comprises particles of functional material which have an average particle size larger than an average inner diameter of the channels and smaller than an inner diameter of the enlarged pore portion.

4. The functional structure according to claim 1, wherein the functional material comprises a catalytic material.

5. The functional structure according to claim 4, wherein the catalytic material contains a metal element (M), and the metal element (M) is included in an amount from 0.5 to 2.5 mass % with respect to the functional structure.

6. The functional structure according to claim 4, wherein the catalytic material comprises particles having an average particle size of 0.08 nm to 50 nm.

7. The functional structure according to claim 5, wherein the catalytic material comprises particles having a ratio of an average particle to an average inner diameter of the channels of the support of from 0.05 to 500.

8. The functional structure according to claim 4, wherein the catalytic material comprises particles having an average particle size of 0.08 nm to 3.3 nm.

9. The functional structure according to claim 1, wherein the supports are present in the form of particles having an average external size of 50 nm or more and 1.00 μm or less.

10. The functional structure according to claim 1, wherein the supports are present in the form of particles having a thickness of 0.05 μm or more and 0.60 μm or less.

11. The functional structure according to claim 1, wherein:
   the support has a plate-like external shape,
   the support has an average external size of more than 1.00 μm and 20.00 μm or less, and
   the support has a ratio (L/D ratio) of maximum external size (L) to thickness (D) of 21 or less.

12. The functional structure according to claim 1, wherein the channels have an average inner diameter of 0.1 nm to 1.5 nm.

13. The functional structure according to claim 1, further comprising at least one additional functional material held on an outer surface of the support.

14. The functional structure according to claim 13, wherein a content of at least one functional material present in the framework is higher than a content of the at least one additional functional material held on the outer surface of the support.

15. The functional structure according to claim 1, wherein the zeolite-type compound is a silicate compound.

16. The functional structure according to claim 1, wherein the functional material is not in direct contact with the framework structure of the zeolite-type compound.

* * * * *